United States Patent
Sreeramoju (10) Patent No.: US 10,462,065 B2
(45) Date of Patent: Oct. 29, 2019

(54) PATH MAXIMUM TRANSMISSION UNIT DISCOVERY

(71) Applicant: VMware, Inc., Palo Alto, CA (US)

(72) Inventor: Akshay Kumar Sreeramoju, Palo Alto, CA (US)

(73) Assignee: VMWARE, INC., Palo Alto, CA (US)

(*) Notice: Subject to any disclaimer, the term of this patent is extended or adjusted under 35 U.S.C. 154(b) by 791 days.

(21) Appl. No.: 14/458,257

(22) Filed: Aug. 13, 2014

(65) Prior Publication Data

US 2015/0381509 A1 Dec. 31, 2015

Related U.S. Application Data

(60) Provisional application No. 62/018,621, filed on Jun. 29, 2014.

(51) Int. Cl.
*H04L 12/805* (2013.01)
*H04L 29/06* (2006.01)

(52) U.S. Cl.
CPC .......... *H04L 47/365* (2013.01); *H04L 69/166* (2013.01)

(58) Field of Classification Search
None
See application file for complete search history.

(56) References Cited

U.S. PATENT DOCUMENTS

| 2002/0188839 | A1* | 12/2002 | Noehring | H04L 29/06 713/153 |
| 2005/0025185 | A1* | 2/2005 | Brown | H04L 29/06 370/474 |
| 2006/0190594 | A1* | 8/2006 | Jorgenson | H04L 12/2697 709/224 |
| 2007/0115963 | A1* | 5/2007 | Vadlakonda | H04L 29/06027 370/389 |
| 2012/0051236 | A1* | 3/2012 | Hegde | H04L 43/10 370/252 |

OTHER PUBLICATIONS

Discussions on Cisco Support Community, Feb. 22, 2010, Retrieved on Aug. 11, 2014 at <URL: https://supportforums.cisco.com/discussion/10840161/no-ip-unreachables>.

* cited by examiner

*Primary Examiner* — Yemane Mesfin
*Assistant Examiner* — Jeff Banthrongsack
(74) *Attorney, Agent, or Firm* — Su IP Consulting (57) ABSTRACT

An example method is provided for a source device to perform discovery of a path maximum transmission unit (PMTU) of a path between the source device and a destination device in a communications network. The method may comprise configuring and sending a request message to the destination device via an intermediate device on the path. The request message may be configured to have a size of an estimated PMTU of the path, to cause a reply message to be received from the destination device or at least one report message to be received from the intermediate device, and to include a flag that allows fragmentation of the request message. The method may further comprise receiving the reply message from the destination device or the at least one report message from the intermediate device responsive to the request message; and based on the reply message or the at least one report message, determining that fragmentation of the request message has occurred because the estimated PMTU is greater than an actual PMTU and updating the estimated PMTU.

22 Claims, 7 Drawing Sheets

PATH MAXIMUM TRANSMISSION UNIT DISCOVERY

CROSS-REFERENCE TO RELATED APPLICATION

The present application claims the benefit of U.S. Provisional Application No. 62/018,621 filed Jun. 29, 2014, which is incorporated herein by reference.

BACKGROUND

Unless otherwise indicated herein, known approaches described are not admitted to be prior art by inclusion throughout the present disclosure.

Communications networks are generally packet-switched networks that operate based on Internet Protocol (IP). When a source device has a large amount of data to send to a destination device, the data may be transmitted as a series of packets via one or more intermediate devices along a path between the source device and the destination device. Any packet that is larger than a path maximum transmission unit (PMTU) of the path are generally fragmented or discarded.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Packet fragmentation and reassembly is generally undesirable because it unnecessarily wastes processing and network resources. Fragmenting a packet generally involves dividing the packet into smaller fragments, which causes more overhead for the destination device to wait until all fragments are received and to reassemble the fragments. Also, each fragment generally has the same header overhead as the original message, which increases the total number of bytes that needs to be transmitted. This may in turn slow the transmission down and adversely affect any guaranteed quality of service (QoS).

Figure 1:
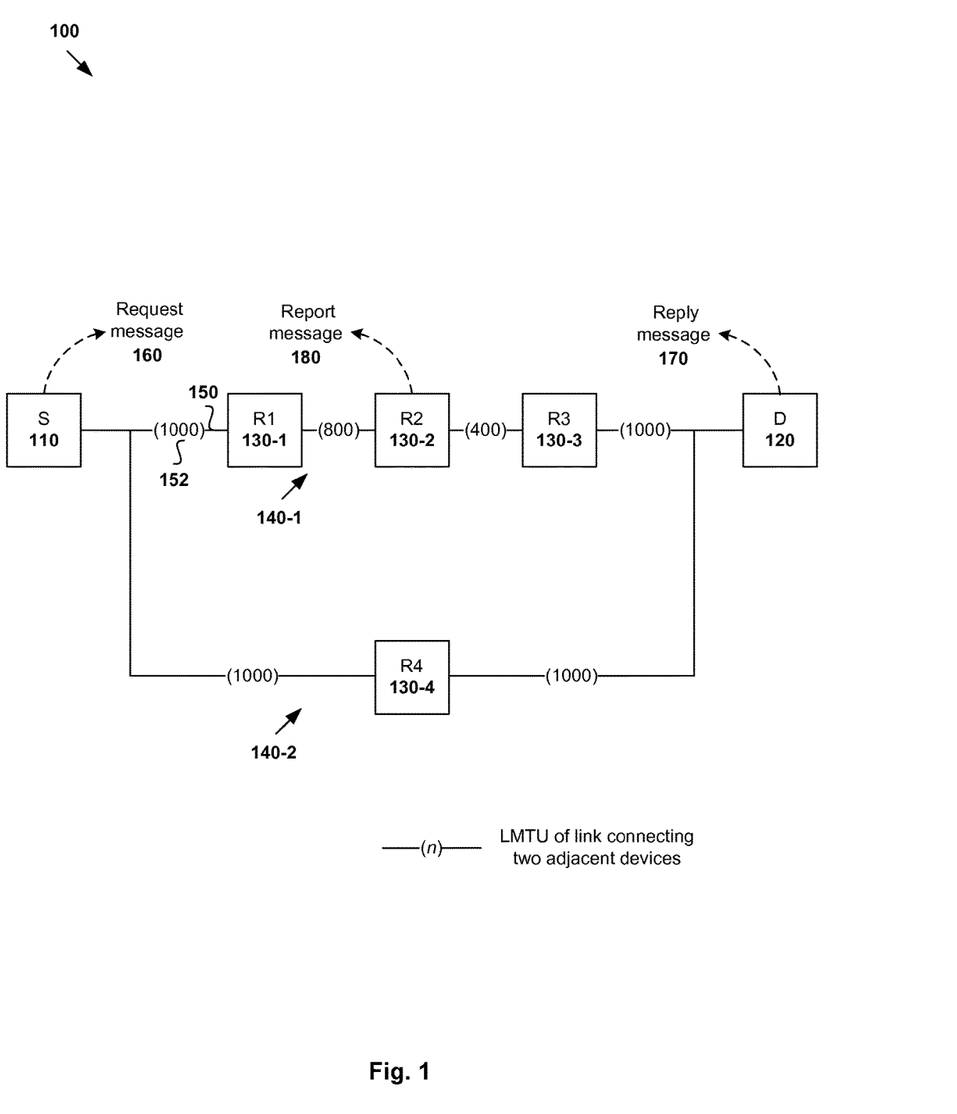
FIG. 1 is a schematic diagram of an example communications network environment in which PMTU discovery may be implemented.

To avoid or reduce the likelihood of packet fragmentation, PMTU discovery for a path between a source device and a destination device may be performed such that packets may be sized accordingly. FIG. 1 is a schematic diagram of example communications network environment 100 in which PMTU discovery may be implemented. Although an example is shown, it will be appreciated that example network 100 may include additional or alternative components.

Example network environment 100 includes source device 110 (e.g., labelled "S") and destination device 120 (e.g., labelled "D") communicating via multiple intermediate devices 130-1 to 130-4 (e.g., "R1", "R2", "R3" and "R4"). Intermediate devices 130-1 to 130-4 will be collectively referred to as "intermediate devices 130" or individually as a general "intermediate device 130." Source device 110, destination device 120 and intermediate devices 130 may be any suitable physical or virtual entity, such as a network layer router (i.e. layer 3), etc. Source device 110 and destination device 120 may also be known as "hosts" while intermediate devices 130 "routers".

Network environment 100 may be any suitable network, such as wide area network (e.g., Internet), virtual private network, etc. In the example in FIG. 1, source device 110 may communicate with destination device 120 via two paths, i.e. "first path" 140-1 via R1 to R3, or "second path" 140-2 via R4. First path 140-1 and second path 140-2 will be collectively referred to as "paths 140" or individually as a general "path 140."

The term "PMTU" refers generally to the maximum packet size that can be sent via path 140 without requiring fragmentation by any intermediate device 130 on path 140. For example, PMTU may be computed as the minimum link MTU (LMTU) 152 along path 140. For source device 110, LMTU 152 (shown in brackets) of link 140 between source device 110 and R1 may be represented as LMTU(S, R1)=1000 bytes, which is the maximum packet size allowed by link 140 without requiring fragmentation. For other links 140 along first path 140-1, LMTU(R1, R2)=800 bytes, LMTU(R2, R3)=400 bytes, LMTU(R3, D)=1000 bytes. For second path 140-2, LMTU(S, R4)=1000 bytes and LMTU(D, R4)=1000 bytes.

In the example in FIG. 1, the PMTU of first path 140-1 is LMTU(R2, R3)=400 bytes, which is the minimum LMTU among LMTU(S, R1), LMTU(R1, R2), LMTU(R2, R3) and LMTU(R3, D). Similarly, the PMTU of second path 140-2 is minimum(LMTU(S, R4), LMTU(D, R4))=1000 bytes. When source device 110 sends packets to destination device 120 via first path 140-1 or second path 140-2, it is preferable that the size of the packets does not exceed the PMTU of that path to avoid or reduce the likelihood of fragmentation and reassembly.

Conventionally, during PMTU discovery, source device 110 sends packets carrying a "Do not fragment" (DF) flag that is set to prevent fragmentation. When intermediate device 130 (e.g., R1) receives a packet with its DF flag set and the size of the packet exceeds the next hop LMTU (e.g., LMTU(R1, R2)=800 bytes), intermediate device 130 (e.g., R1) drops the packet and sends an error message to source device 110. The error message is generally an Internet Control Message Protocol (ICMP) "Fragmentation Needed" (type 3, code 4) message, which enables source device 110 to learn that fragmentation is required and adjust its estimated PMTU accordingly.

However, due to various reasons (e.g., security and administrative reasons, etc.), not all intermediate devices 130 are cooperative. Instead of sending such "Fragmentation Needed" messages, intermediate devices 130 may simply discard the packets that require fragmentation, or ignore the DF flag and fragment the packets. This not only increases the rate of packet loss and retransmissions, but may prevent source device 110 to adjust its estimated PMTU accordingly. As such, PMTU discovery approaches that rely on setting the DF flag are not always effective.

According to examples of the present disclosure, instead of relying on "Fragmentation Needed" messages, source device 110 may perform PMTU discovery and learn that fragmentation has occurred based on other behaviour of intermediate device 130 and destination device 120. In particular, referring to FIG. 1 again, source device 110 may send request message 160 addressed to destination device 120 via intermediate devices 130 (e.g., R1, R2, R3, etc.). Fragmentation of request message 160 is allowed, which means it is not necessary to set the DF flag in request message 160. Based on reply message 170 from destination device 110 or at least one report message 180 from intermediate device 130 (e.g., R2), source device 110 may determine that fragmentation of request message 160 has occurred and adjust its estimated PMTU accordingly.

Figure 2:
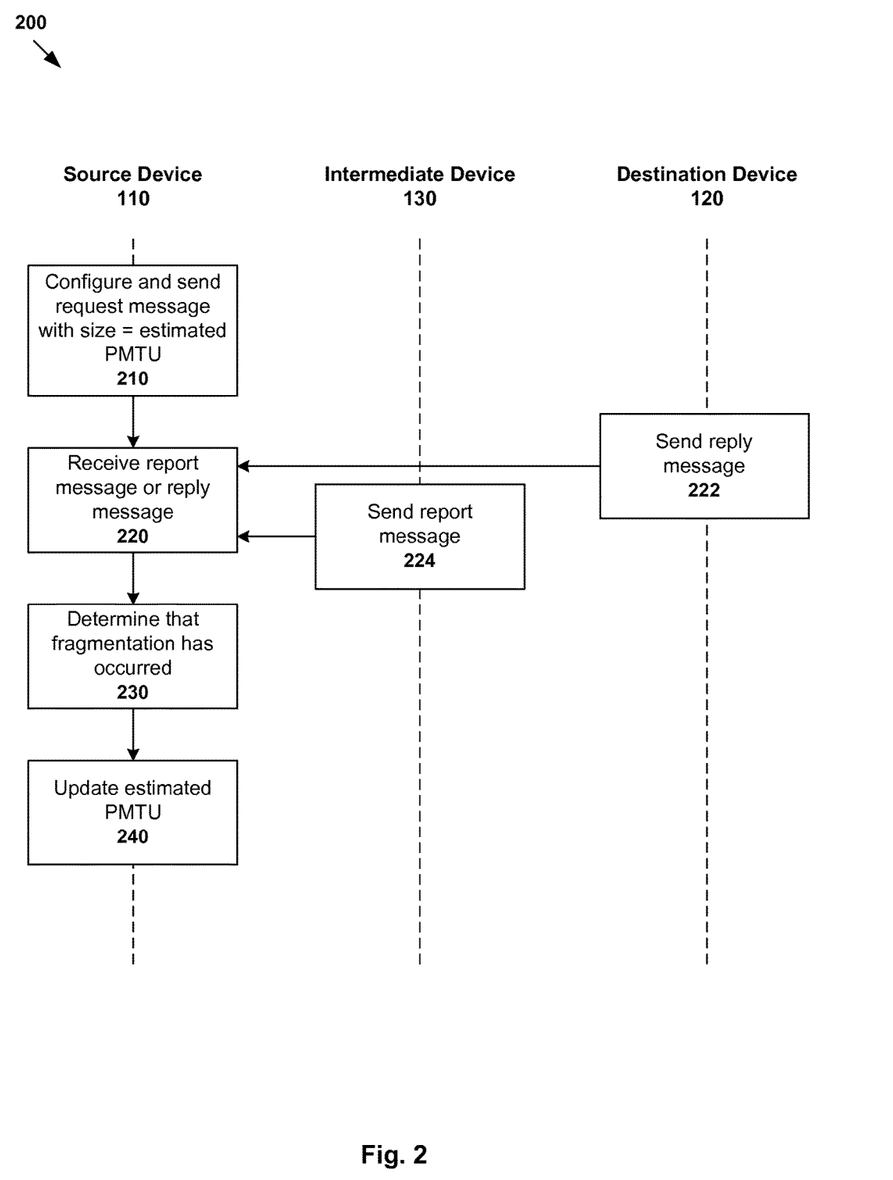
FIG. 2 is a flowchart of an example process for PMTU discovery.

In more detail, FIG. 2 is a flowchart of an example process 200 for PMTU discovery. Example process 200 may include one or more operations, functions, or actions illustrated by one or more blocks, such as blocks 210 to 240. The various blocks may be combined into fewer blocks, divided into additional blocks, and/or eliminated based upon the desired implementation.

At block 210 in FIG. 2, source device 110 configures and sends request message 160 to destination device 120 via intermediate device 130 (e.g., R2). Request message 160 is configured to have a size of an estimated PMTU of path 140 (e.g., first path 140-1). Request message 160 is also configured to cause reply message 170 to be received from destination device 120 or at least one report message 180 to be received from intermediate device 130 (e.g., R2), and to have an indicator that allows fragmentation of request message 160.

At blocks 220, 222 and 224 in FIG. 2, source device 110 receives reply message 170 from destination device 110, or at least one report message 180 from intermediate device 130 (e.g., R2).

The terms "request message", "reply message" and "report message" may be messages generated using any suitable protocol, such as ICMP for IP version 4 (IPv4), etc. For example, request message 160 may be any suitable message that, when received by destination device 120, causes destination device 120 to respond with reply message 170. When ICMP is used, request message 160 may be an ICMP echo request message (type 8) and reply message 170 may be an ICMP echo reply message (type 0).

Report message 180 may be any suitable message sent by intermediate device 130 that allows source device 110 to determine that fragmentation of request message 160 has occurred. When ICMP is used, report message 180 may be a time to live (TTL) expired message (type 11) that is sent when a TTL parameter in request message 160 decrements to zero at intermediate device 130 (e.g., R2).

At block 230 in FIG. 2, based on reply message 170 from destination device 120 or at least one report message 180 from intermediate device 130, source device 110 determines that fragmentation of request message 160 has occurred because the estimated PMTU at block 210 is greater than an actual PMTU of path 140.

For example, source device 110 may determine that fragmentation of request message 160 has occurred if multiple fragments of reply message 170 are received. In another example, source device 110 may determine that fragmentation of request message 160 has occurred if multiple report messages 180 are received. For example, if intermediate device (e.g., R2) receives multiple fragments of request message 160 (e.g., from R1), intermediate device (e.g., R2) may generate multiple report messages 160 (e.g., if the TTL parameter in each fragment decrements to zero).

At block 240 in FIG. 2, based on reply message 170 from destination device 120 or at least one report message 180 from intermediate device 130, source device 110 may update the estimated PMTU used at block 210. For example, the estimated PMTU may be updated based on the largest fragment corresponding to report message 180 or the largest fragment of reply message 170.

Using example process 200, it is not necessary to set the DF flag of request message 160. This avoids the need to, for example, modifying existing administrative privilege to set the DF flag (such modification may be difficult in some cases). Further, it is not necessary to rely on "Fragmentation Needed" messages from intermediate devices 130. Example process 200 may be used in any suitable application, such as to facilitate packet transmission for applications that require high throughput. In such applications, a large amount of data needs to be transmitted from source device 110 to destination device 120 using packets. Since fragmentation of such packets may be avoided if not reduced using example process 200, the likelihood of having to process and reassemble a large number of fragments for a large number of packets is also reduced.

Example process 200 may be implemented when the routing between source device 110 and destination device 120 is symmetric or asymmetric. Referring to example network 100 in FIG. 1 again, source device 110 and destination device 120 may send messages to each other using first path 140-1 or second path 140-2. If both source device 110 and destination device 120 use the same path (e.g., first path 140-1), the routing between them is known as "symmetric routing." On the other hand, if different paths are used (e.g., first path 140-1 as forward path, second path 140-2 as reverse path), the routing is generally known as "asymmetric routing."

In the case of symmetric routing, source device 110 may configure request message 160 to cause destination device 120 to respond with reply message 170. To increase or maximize the likelihood of request message 160 reaching destination device 120, a TTL parameter of request message 160 may be set to maximum (e.g., 255), etc. Non-expiry of the TTL parameter at intermediate device 120 allows request message 160 to reach destination device 120, which then sends reply message 170 to source device 110. Based on reply message 170, source device 110 may then determine that fragmentation of request message 160 has occurred.

In the case of asymmetric routing, fragmentation of reply message 170 from destination device 120 may not occur on the reverse path. For example, in FIG. 1, request message 160 (e.g., 1000 bytes) from source device 110 to destination device 120 is fragmented when first path 140-1 is used (e.g., due to LMTU(R1, R2)=800 bytes and LMTU(R2, R3)=400 bytes). However, if second path 140-2 is used as the reverse path, reply message 170 (e.g., 1000 bytes) from destination device 120 to source device 110 (e.g., due to LMTU(S, R4)=LMTUD, R4)=1000 bytes) will not be fragmented. In this case, source device 110 may not be able to learn that fragmentation has occurred to adjust its estimated PMTU for first path 140-1 accordingly.

As such, in the case of asymmetric routing, source device 110 configure request message 160 to cause intermediate device 130 (e.g., R2) to respond with report message 180. If fragmentation of request message 160 has occurred, source device 110 may receive multiple report messages each for a fragment of request message 160. To iteratively adjust its estimated PMTU, source device 110 may cause multiple intermediate devices 130 (e.g., R1, R2 and R3) to each respond with report message 180. For example, the TTL parameter in request message 160 may be updated at each iteration such that it is decremented to zero at different intermediate devices 130. This way, source device 110 may discover different LMTUs (e.g., 152) along path 140 (e.g., first path 140-1) to adjust its estimated PMTU accordingly.

Example request message 160, reply message 170 and report message 180 will be discussed with reference to FIG. 3A to FIG. 3D. Example PMTU discovery in the case of symmetric routing will be discussed with reference to FIG. 4 and FIG. 5, while the case of asymmetric routing with reference to FIG. 6 and FIG. 7.

Example Messages

Example request message 160, reply message 170 and report message 180 will now be explained with reference to FIG. 3A to FIG. 3D. Although ICMP is used as an example, it will be appreciated that any other suitable protocol may be used and the example messages may have alternative or additional fields and configuration.

Figure 3A:
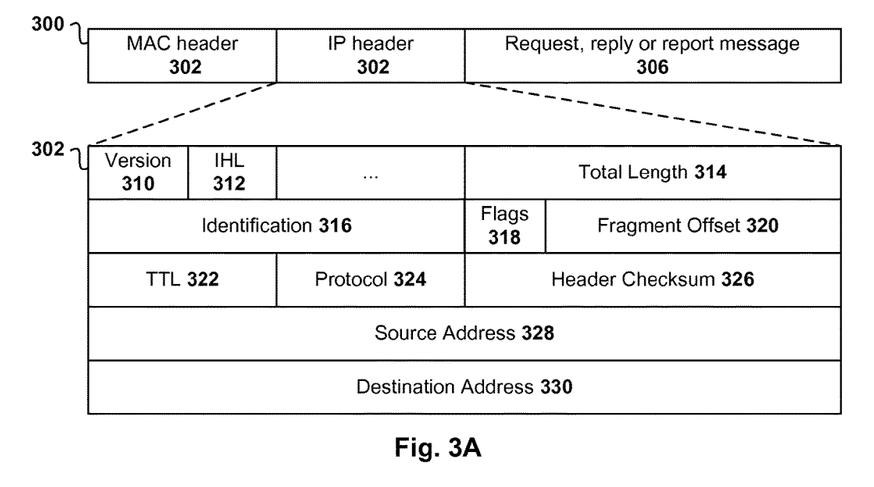
FIG. 3A is a schematic diagram of an example format for a request message, reply message and report message.

FIG. 3A is a schematic diagram of example format 300 of request message 160, reply message 170 and report message 180. Example format 300 includes suitable header information, such as media access control (MAC) header 302 for layer 2 forwarding, and IP header 304 for layer 3 forwarding, etc. The rest of the message (see 306) contains ICMP header and data of request message 160, reply message 170 or report message 180.

In more detail, IP header 304 may include the following fields. Version field 310 includes the IP version number used (e.g., version 4 for IPv4). IHL or Internet Header Length 312 is the number of 32-bit words in the header. Total length 314 defines the entire packet (or fragment) size including header and data. Identification 316 is used for identifying a group of fragments.

Flags field 318 is used to control or identify fragments. When DF flag 318 of request message 160 is not set (i.e. value=0) to allow fragmentation, intermediate device 130 (e.g., R1) may fragment request message 160 (e.g., 1000 bytes) into smaller fragments if its size exceeds the next hop LMTU (e.g., LMTU(R1, R2)=800 bytes). Fragment offset field 320 specifies the offset of a particular fragment relative to the beginning of the original, unfragmented message (i.e. offset=0 for the first fragment). The first fragment is generally the largest fragment. For subsequent fragments, the offset will be (i) the offset of the previous fragment plus (ii) the total length of the previous fragment minus (iii) the IP header length of the previous segment. The offset indicates where the data in the fragment fits into the data in the original message.

TTL parameter 322 sets the limit of the message's lifetime. Every time request message 160 is received by intermediate device 130, the value of TTL parameter 322 in header 302 is decremented by one. When TTL parameter 322 in request message 160 is decremented to zero, intermediate device 130 discards the message and responds to source device 110 with report message 180 in the form of TTL expired message (see FIG. 3D).

Protocol field 324 identifies the protocol used in the data portion of the message. Header checksum field 326 is used for error checking. Source address 328 and Destination address 330 fields hold the addresses of the sender and recipient, respectively. For example, in request message 160, the sender and recipient are source device 110 and destination device 120, respectively. The reverse is true for reply message 170. Although not illustrated, header 302 may include additional "Options" field for various purposes.

Figure 3B:
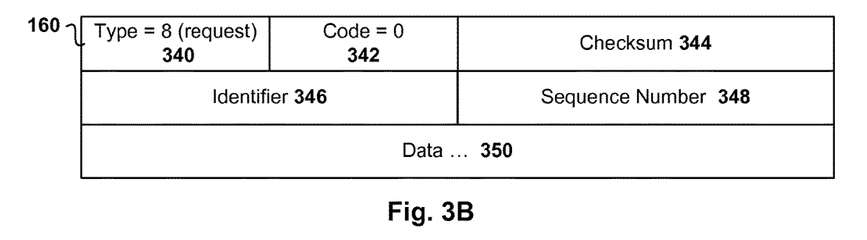
FIG. 3B is a schematic diagram of an example request message in the form of an echo request message.
Figure 3C:
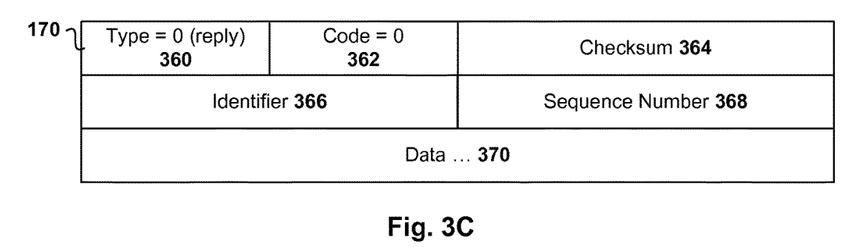
FIG. 3C is a schematic diagram of an example reply message in the form of an echo reply message.

FIG. 3B is a schematic diagram of example request message 160 in the form of an echo request message (type 8) and FIG. 3C is a schematic diagram of example reply message 170 in the form of an echo reply message (type 0). Both example messages 160 and 170 have a similar format. Type field 340/360 is used to indicate that a message is either echo request (type=8) or echo reply (type=0). Code field 342/362 generally has the value of zero for both request 160 and reply 170 messages. Checksum field 344/364 is used for error checking. Identifier 346/366 and sequence number 348/368 may each hold a 16-bit value to help source device 110 to match reply message 170 with request message 160. Data field 350/370 holds any suitable data information.

In response to receiving request message 160, destination device 120 generates reply message 170 with the same identifier 346/366, sequence number 348/368 and data 350/370. Also, source address 328 in IP header 302 of request message 160 is the address of destination device 120, while destination address 330 is the address of source device 110. DF flag 318 in IP header 302 of both request message 160 and reply message 170 is not set (i.e. value=0) to allow fragmentation.

Figure 3D:
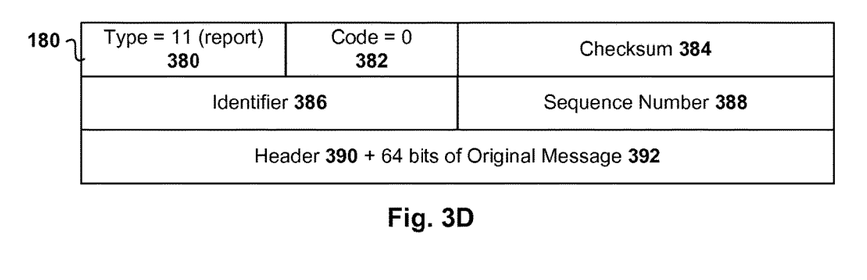
FIG. 3D is a schematic diagram of an example report message in the form of a time to live (TTL) expired message.

FIG. 3D is a schematic diagram of example report message 180 in the form of a TTL expired message 180. Type 380 and Code 382 fields are set to type=11 and code=0, respectively. Checksum field 384 is used for error checking. TTL expired message generally carries information obtained from the original request message 160, including its header information 390 (e.g., IP header 302 in FIG. 3A) and payload information 392 (e.g., first 64 bits of data in request message 160).

Symmetric Routing

Figure 4:
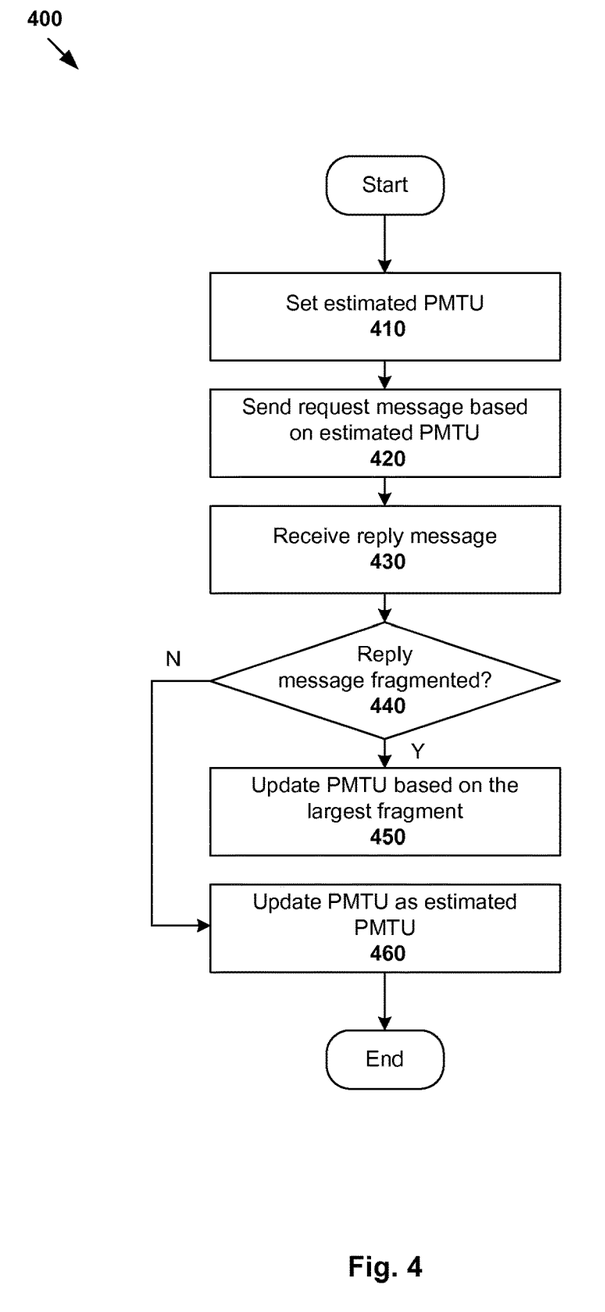
FIG. 4 is a flowchart of an example process for PMTU discovery in the case of symmetric routing.
Figure 5:
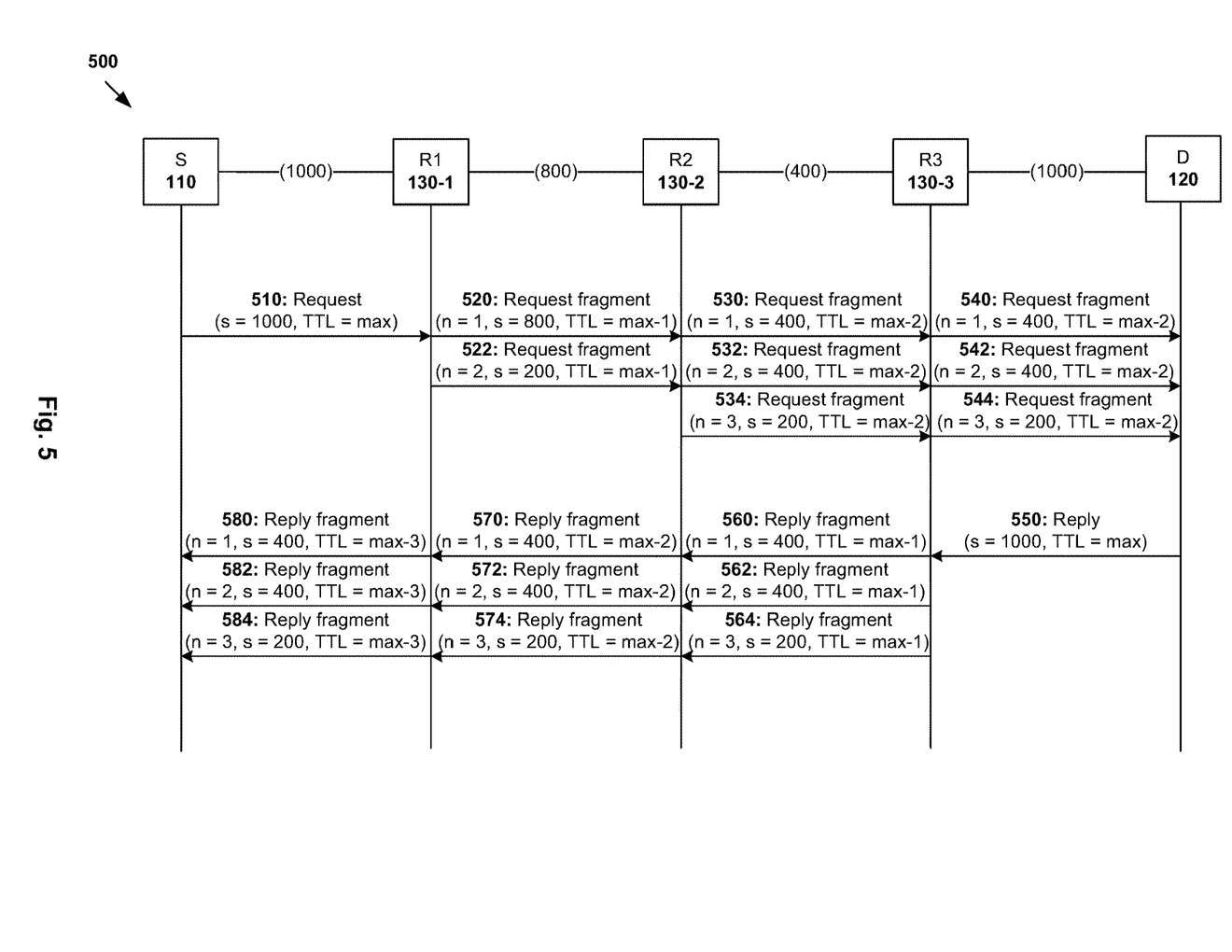
FIG. 5 is a message flow diagram illustrating example messages in the case of symmetric routing when the example process in FIG. 4 is implemented in the example network environment in FIG. 1.

Examples in FIG. 4 and FIG. 5 will be used to illustrate PMTU discovery in the case of symmetric routing. In the following examples, source device 110 and destination device 120 send messages to each other using first path 140-1. Request message 160 from source device 110 is forwarded via R1, R2 and R3 to reach destination device 120. On the reverse path, reply message 170 from destination device 120 is forwarded via R3, R2 and R1 to reach source device 110.

FIG. 4 is a flowchart of example process 400 for PMTU discovery in the case of symmetric routing. Example process 400 may include one or more operations, functions, or actions illustrated by one or more blocks, such as blocks 410 to 460. The various blocks may be combined into fewer blocks, divided into additional blocks, and/or eliminated based upon the desired implementation. FIG. 4 will be explained with reference to FIG. 5, which is a message flow diagram 500 illustrating example messages in the case of symmetric routing when example process 400 in FIG. 4 is implemented in example network environment 100 in FIG. 1.

(a) Forward Path

At block 410 in FIG. 4 (related to block 210 in FIG. 2), source device 110 sets an estimated PMTU, such as based on the next hop LMTU 152. In example network environment 100 in FIG. 1, source device 110 sets the estimated PMTU to LMTU(S, R1)=1000 bytes.

At block 420 in FIG. 4 (related to block 210 in FIG. 2), source device 110 sends request message 160 to destination device 120 based on the estimated PMTU. For example, request message 160 may be configured to have a size of 1000 bytes. This length information is generally stored in Total Length field 314 in IP header 302 of request message 160.

Request message 160 is also configured to cause destination device 120 to respond with reply message 170. TTL parameter 322 of request message 160 may be set to any suitable value (e.g., maximum value 255) to maximize its likelihood of reaching destination device 120 while reducing its likelihood of the TTL parameter expiring at intermediate device 130. Request message 160 is also configured to allow fragmentation by setting the value of DF flag 318 (see FIG. 3A) to zero. The value of DF flag 318 in reply message 170 is also configured to allow fragmentation of reply message 170 on the reverse path.

As shown in more detail in FIG. 5, request message 160 is transmitted from source device 110 to destination device 120 via R1 to R3. At 510 in FIG. 5, source device 110 sends request message 160 with size (s)=1000 bytes, TTL=maximum (e.g., 255) and DF flag 318=0 to adjacent intermediate device R1.

Referring to R1, in response to receiving request message 160, R1 decrements TTL parameter 322 of request message 160 by one (e.g., to maximum−1). R1 also determines that fragmentation is required because the size of request message 160 (e.g., 1000 bytes) is greater than the next hop LMTU (e.g., LMTU(R1, R2)=800 bytes). At 520 and 522 in FIG. 5, since DF flag 318 is not set, R1 fragments request message 160 into two fragments not exceeding 800 bytes, i.e. first fragment (fragment number n=1, size=800 bytes) and second fragment (n=2, size=200 bytes). For simplicity and illustrative purposes, the total size of first and second fragments is the same as the size of the original, unfragmented request message 160. In practice, the total size may be greater than the size of request message 160 due to header overhead.

Referring to R2, in response to receiving fragments of request message 160 from R1, R2 decrements TTL parameter 322 of each fragment by one. R2 also determines that further fragmentation is required because the size of the largest fragment (e.g., first fragment, size=800 bytes) is greater than the next hop LMTU (e.g., LMTU(R2, R3)=400 bytes). At 530, 532 and 534 in FIG. 5, since DF flag 318 is not set, R2 performs fragmentation and sends three fragments to R3, i.e. first fragment (n=1, size=400 bytes), second fragment (n=2, size=400 bytes) and third fragment (n=3, size=200 bytes).

Referring to R3, in response to receiving fragments of request message 160 from R2, R3 decrements TTL parameter 322 of each fragment by one. R3 also determines that no further fragmentation is required because the size of each fragment is less than the next hop LMTU (e.g., LMTU(R3, D)=1000 bytes). At 540, 542 and 544 in FIG. 5, R3 sends the three fragments to destination device 120, i.e. first fragment (n=1, size=400 bytes), second fragment (n=2, size=400 bytes) and third fragment (n=3, size=200 bytes).

Referring to destination device 120, in response to receiving fragments from R3, they are reassembled into request message 160, to which destination device 120 responds with reply message 170.

(b) Reverse Path

At 550 in FIG. 5, destination device 120 sends reply message 170 to source device 110. For example, reply message 170 may be echo reply message (see FIG. 3C) with DF flag 318 not set and TTL parameter 322 set to maximum. Other fields (e.g., identifier 366, sequence number 368 and data 370) are unchanged. Since data received in request message 160 is returned in reply message 170, the size of reply message 160 is also 1000 bytes, which does not exceed LMTU(R3, D)=1000 bytes. Similar to request message 160, TTL parameter 322 of reply message 170 may be set to, for example, maximum (e.g., 255) to maximize its likelihood of reaching source device 110.

Referring to R3 again, in response to receiving reply message 170, R3 determines that fragmentation is required because the size of reply message 170 (e.g., 1000 bytes) is greater than the next hop LMTU (e.g., LMTU(R2, R3)=400 bytes). At 560, 562 and 564 in FIG. 5, R3 sends three fragments to R2, i.e. first fragment (n=1, size=400 bytes), second fragment (n=2, size=400 bytes) and third fragment (n=3, size=200 bytes). TTL parameter 322 in each of the three fragments is also decremented by one.

Referring to R2, in response to receiving the fragments from R3, R2 determines that fragmentation is not required because the size of the largest fragment (e.g., first fragment with size=400 bytes) is less than the next hop LMTU (e.g., i.e. LMTU(R1, R2)=800 bytes). At 570, 572 and 574 in FIG. 5, R2 forwards the same fragments to R1, i.e. first fragment (n=1, size=400 bytes), second fragment (n=2, size=400 bytes) and third fragment (n=3, size=200 bytes).

Referring to R1, in response to receiving the fragments from R2, R1 determines that fragmentation is not required because the size of the largest fragment (e.g., first fragment with size=400 bytes) is less than the next hop LMTU (e.g., LMTU(S, R1)=1000 bytes). At 580, 582 and 584 in FIG. 5, R1 forwards the received fragments to source device 110, i.e. first fragment (n=1, size=400 bytes), second fragment (n=2, size=400 bytes) and third fragment (n=3, size=200 bytes).

Referring to FIG. 4 again and continuing at block 430 (related to block 220 in FIG. 2), source device 110 receives reply message 170 from destination device 120. In this case, since fragmentation of reply message 170 has occurred, multiple fragments of reply message 170 are received by source device 110.

At blocks 440 and 450 in FIG. 4 (related to blocks 230 and 240 in FIG. 2), source device 110 determines that fragmentation of reply message 170 has occurred based on the multiple fragments received at block 430. In this case, PMTU (e.g., PMTU of first path 140-1) is updated based on the largest fragment (e.g., first fragment with size=400 bytes). Otherwise (fragmentation has not occurred), at block 450 in FIG. 4, the estimated PMTU (e.g., 1000 bytes) at block 410 is determined as the PMTU for first path 140-1.

Asymmetric Routing

Figure 6:
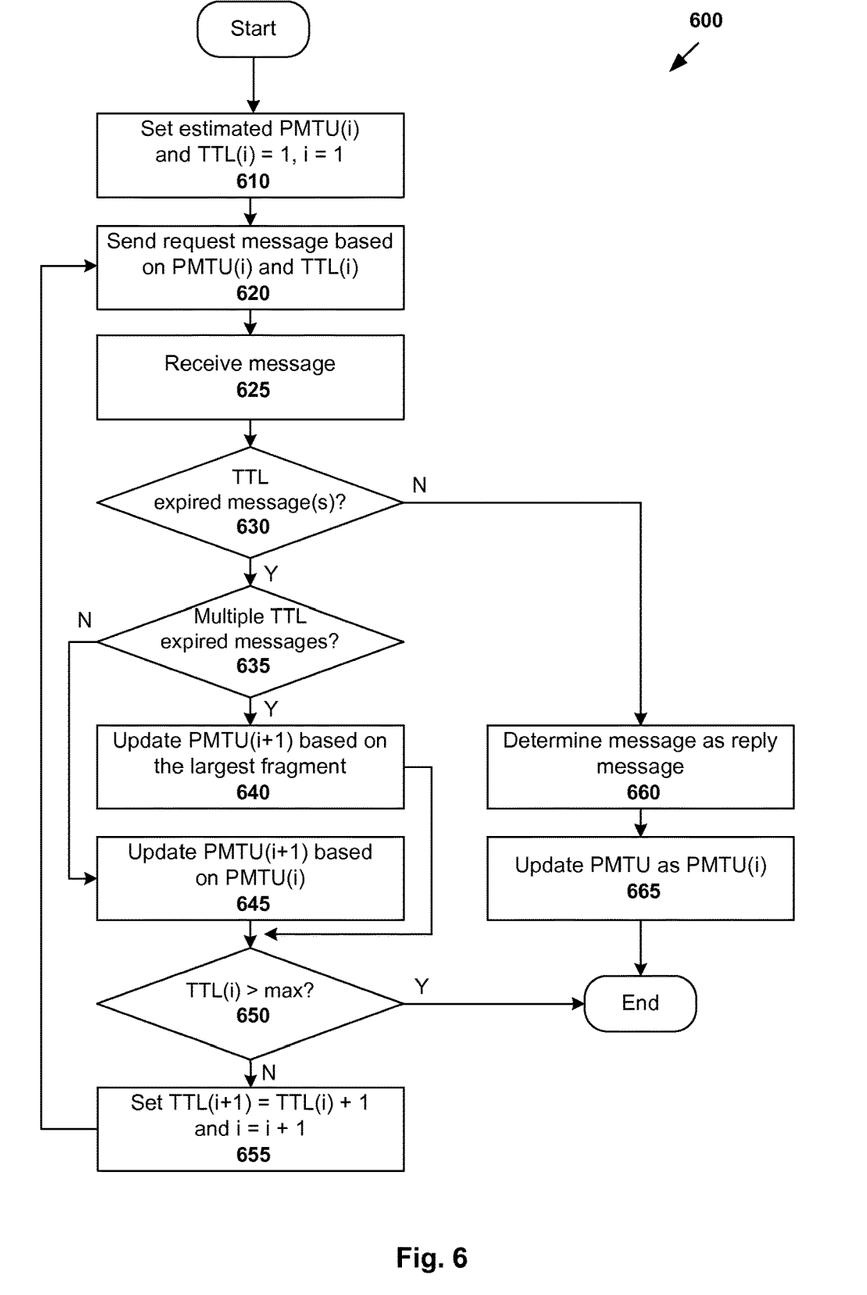
FIG. 6 is a flowchart of an example process for PMTU discovery in the case of asymmetric routing.
Figure 7:
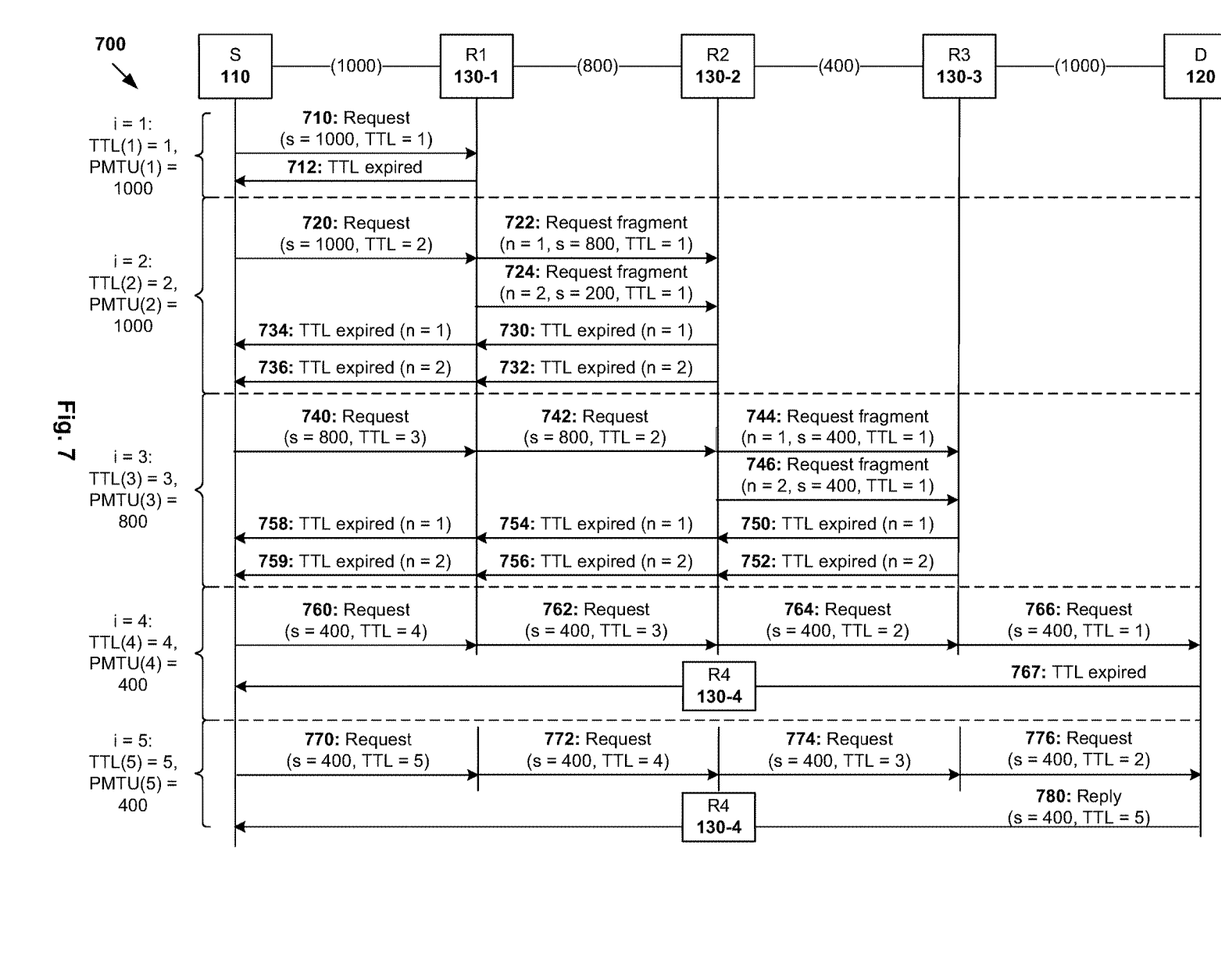
FIG. 7 is a message flow diagram illustrating example messages in the case of asymmetric routing when the example process in FIG. 6 is implemented in the example network environment in FIG. 1.

Examples in FIG. 6 and FIG. 7 will be used to illustrate PMTU discovery in the case of asymmetric routing. Compared to the examples in FIG. 4 and FIG. 5, messages between source device 110 to destination device 120 are forwarded using different paths. For example, source device 110 sends request message 160 to destination device 120 using first path 140-1 (i.e. via R1 to R2 to R3). On the reverse path, destination device 120 sends reply message 170 to source device 110 using second path 140-2 (i.e. via R4).

In more detail, FIG. 6 is a flowchart of example process 600 for PMTU discovery in the case of asymmetric routing. Example process 600 may include one or more operations, functions, or actions illustrated by one or more blocks, such as blocks 610 to 665. The various blocks may be combined into fewer blocks, divided into additional blocks, and/or eliminated based upon the desired implementation. FIG. 6 will be explained with reference to FIG. 7, which is a message flow diagram 700 illustrating example messages in the case of asymmetric routing when example process 600 in FIG. 6 is implemented in example network environment 100 in FIG. 1.

Compared to example process 400 in FIG. 4, example process 600 for the case of asymmetric routing is iterative, where PMTU(i) and TTL(i) are updated at each iteration (e.g., iteration i=1, 2, 3, and so on). At each iteration, source device may update PMTU(i) based on report message 180 from intermediate device 130 (e.g., R1, R2, R3). This process may be repeated until reply message 170 is received from destination device 120.

In the examples below, TTL expired message (see FIG. 3D) may be used as report message 180. Source device 110 may then determine that fragmentation of request message 160 has occurred if multiple TTL expired messages are received. To cause different intermediate devices 130 (e.g., R1, R2 and R3) to respond with report message(s) 180 at different iterations, source device 110 may increase TTL parameter 322 in request message 160 at each iteration, such as TTL(i)=i, (i.e. TTL(1)=1, TTL(2)=2, etc,). This way, TTL parameter 322 may be decremented to zero at different intermediate devices 130 at different iterations.

(a) Iteration i=1

At blocks 610 and 620 in FIG. 6 (related to block 210 in FIG. 2), source device 110 initializes sends request message 160 configured to have a size PMTU(1)=LMTU(S, R1)=1000 bytes to destination device 120. In IP header 302 of request message 160, TTL parameter 322 is set to TTL(1)=1, and DF flag 318 is set to zero to allow fragmentation. Expiry of TTL parameter 322 causes intermediate device (e.g., R1) to respond with TTL expired message 180.

Referring to R1, in response to receiving request message 160, R1 decrements TTL parameter 322 of request message 160 by one (e.g., from TTL(1)=1 to 0). This causes R1 to respond with TTL expired message 180 (see 712 in FIG. 7).

Referring to source device 110, at blocks 625 and 630 in FIG. 6 (related to block 220 in FIG. 2), source device 110 receives TTL expired message 180 from R1. Next, at blocks 635 and 640 in FIG. 6 (related to block 230 in FIG. 2), source device 110 determines whether fragmentation of request message 160 has occurred. In this case, since only one TTL expired message 180 is received, source device 110 determines that fragmentation has not occurred. Source device 110 then proceeds to block 645 to set PMTU(2)=PMTU(1)=1000 bytes.

At blocks 650 and 655 in FIG. 6, since TTL(1)=1 is less than a maximum threshold (e.g., 255), TTL parameter 322 is increased by one, i.e. TTL(2)=TTL(1)+1=2. Source device 110 proceeds to block 620 again.

(b) Iteration i=2

At block 620 in FIG. 6 again (related to block 210 in FIG. 2), source device 110 sends request message 160 addressed to destination device 120. See also 720 in FIG. 7. Request message 160 is configured to have size PMTU(2)=1000 bytes, TTL parameter 322 is set to TTL(2)=2 to travel an additional hop. DF flag 318 is not set to allow fragmentation.

Referring to R1, in response to receiving request message 160, R1 decrements TTL parameter 322 of request message 160 from 2 to 1, and determines that fragmentation is required because its size is greater than the next hop LMTU (e.g., LMTU(R1, R2)=800 bytes). At 722 and 724 in FIG. 7, R1 performs fragmentation and sends two fragments to R2, i.e. first fragment with fragment number n=1, size=800 bytes and TTL=1, and second fragment with n=2, size=200 bytes and TTL=1.

Referring to R2, in response to receiving the fragments from R1, R2 decrements the value of TTL parameter 322 of each fragment from 1 to 0. At 730 and 732 in FIG. 7, since the TTL=0, R2 responds with two TTL expired messages, one TTL expired message for each fragment of request message 160.

Referring to R1, at 734 and 736 in FIG. 7, R1 forwards the TTL expired messages from R2 to source device 110.

Referring to source device 110, at blocks 625 and 630 in FIG. 6, source device 110 receives TTL expired messages from R1. According to block 635, since multiple TTL expired messages are received, source device 110 determines that request message 160 sent at the beginning of iteration i=2 (see 720 in FIG. 7) has been fragmented and its estimated PMTU should be adjusted.

Next, at block 640 in FIG. 6, source device 110 updates PMTU(3) based on TTL expired message for the largest fragment (e.g., 800 bytes). In practice, source device 110 may analyse header information (390 in FIG. 3D) in TTL expired message 180 to determine the size of the largest fragment. In particular, TTL expired message generally contains, as its data, header information (390 in FIG. 3D) in report message 180 may include total length 314 of the original message or fragment for which it is reporting for TTL expiration.

At blocks 650 and 655 in FIG. 6, since TTL(2)=2 is less than a maximum threshold (e.g., 255), TTL parameter 322 is increased by one, i.e. TTL(3)=TTL(2)+1=3. Source device 110 proceeds to block 620 again.

(c) Iteration i=3

At block 620 in FIG. 6 again (related to block 210 in FIG. 2), source device 110 sends request message 160 addressed to destination device 120. See also 740 in FIG. 7. This time, request message 160 is configured to have size PMTU(3)=800 bytes, which is smaller than the size sent in the previous iterations. Also, TTL parameter 322 of request message 160 is set to TTL(3)=3 to travel an additional hop, and DF flag 318 not set to allow fragmentation.

Referring to R1, in response to receiving request message 160 from source device 110, R1 decrements its TTL parameter 322 from 3 to 2, and determines that fragmentation is not required because the size of request message 160 (i.e. 800 bytes) does not exceed the next hop LMTU (e.g., LMTU(R1, R2)=800 bytes). At 742 in FIG. 7, R1 forwards request message 160 to R2 without fragmentation.

Referring to R2, in response to receiving request message 160 from R1, R2 decrements its TTL parameter 322 from 2 to 1, and determines that fragmentation is required because the size of request message 160 (e.g., 800 bytes) is greater than the next hop LMTU (e.g., LMTU(R1, R2)=400 bytes). At 744 and 746 in FIG. 7, R2 performs fragmentation and sends two fragments to R3, i.e. first fragment with n=1, size=400 bytes and TTL=1, and second fragment with n=2, size=400 bytes and TTL=1.

Referring to R3, in response to receiving the fragments from R2, R3 decrements TTL parameter 322 of each fragment from 1 to 0. At 750 and 752 in FIG. 7, since the TTL=0, R3 responds with two TTL expired messages, one TTL expired message for each fragment 744/746 of request message 160. The TTL expired messages are forwarded to source device 110 via R2 (see 754 and 756) and R1 (see 758 and 759).

Referring to source device 110, at blocks 625 and 630 in FIG. 6, source device 110 receives the TTL expired messages from R1. At block 635, since multiple TTL expired messages are received, source device 110 determines that fragmentation of request message 160 with size PMTU(3)= 800 bytes is required.

Next, at block 640 in FIG. 6, source device 110 updates PMTU(4) to 400 bytes based on TTL expired message 758 for the largest fragment. For example, to determine the size of the largest fragment, source device 110 may analyse header information (390 in FIG. 3D) in the TTL expired messages received from R1. At blocks 650 and 655 in FIG. 6, since TTL(3)=3 is less than a maximum threshold (e.g., 255), TTL parameter 322 is increased by one, i.e. TTL(4)= TTL(3)+1=4. Source device 110 proceeds to block 620 again.

(d) Iteration i=4

At block 620 in FIG. 6 again (related to block 210 in FIG. 2), source device 110 sends request message 160 addressed to destination device 120. See also 760 in FIG. 7. This time, request message 160 is configured to have size PMTU(4)= 400 bytes, TTL parameter 322 TTL(4)=4, and DF flag 318 not set to allow fragmentation.

Request message 160 is forwarded to destination device 120 via R1 (see 762 in FIG. 7), R2 (see 764 in FIG. 7) and R3 (see 766 in FIG. 7) without requiring fragmentation. At each hop, the value of TTL parameter 322 of request message 160 is decremented from 4 to 3 to 2 to 1.

Referring to destination device 120, in response to receiving request message 160 with TTL=1 from R3, destination device 120 decrements TTL parameter 322 to zero, and responds with a TTL expired message (see 767 in FIG. 7). Since the case of asymmetric routing is illustrated in FIG. 7, destination device 120 uses second path 140-2 (i.e. via R4) to reach source device 110.

(e) Iteration i=5 (Final Iteration)

At block 620 in FIG. 6 again (related to block 210 in FIG. 2), source device 110 sends request message 160 addressed to destination device 120. See also 770 in FIG. 7. This time, request message 160 is configured to have size PMTU(5)= 400 bytes, TTL(5)=5, and DF flag 318 not set to allow fragmentation. In this case, PMTU(5) is unchanged from PMTU(4) because the request message 160 with size PMTU (4)=400 bytes in the previous iteration is not fragmented.

Request message 160 is forwarded to destination device 120 via R1 (see 772 in FIG. 7), R2 (see 774 in FIG. 7) and R3 (see 776 in FIG. 7) without requiring fragmentation. At each hop, the value of TTL parameter 322 of request message 160 is decremented from 5 to 4 to 3 to 2 to 1.

Referring to destination device 120, in response to receiving request message 160 from R3, destination device 120 responds with reply message 170. When ICMP is used, echo reply message 170 (see FIG. 3C) generally has the same data and length as echo request message 160 (see FIG. 3B) from source device 110. At 780 in FIG. 7, destination device 120 sends reply message 170 to source device 110. Since the case of asymmetric routing is illustrated in FIG. 7, destination device 120 uses second path 140-2 (i.e. via R4) to reach source device 110.

Referring to source device 110, at blocks 625, 630 and 660 in FIG. 6, source device 110 receives reply message 170 from destination device 120 via R4. At block 665, source device sets the PMTU to PMTU(5)=400 bytes, and example process 600 ends. As such, although reply message 170 from destination device 120 uses second path 140-2 instead of first path 140-1 used by request message 160, source device 110 is still able to adjust its estimated PMTU(1)=1000 bytes at the first iteration to PMTU(5)=400 bytes at the final iteration.

In practice, source device 110 may not know whether its routing with destination device 120 is symmetric or asymmetric. In this case, source device 110 may perform both example process 400 in FIG. 4 and example process 600 in FIG. 6.

The above examples can be implemented by hardware (including hardware logic circuitry), software or firmware or a combination thereof. For example, source device 110, destination device 120 and intermediate device 130 may be implemented by any suitable computer system or computing device, which may include processor and memory that may communicate with each other via a bus (not shown for simplicity), etc. Memory may store computer-readable instructions which, in response to execution by processor, cause processor 520 to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method for a source device to perform discovery of a path maximum transmission unit (PMTU) of a path between the source device and a destination device in a communications network, comprising:
    configuring, by the source device, a request message to have a size of an estimated PMTU of the path, wherein the estimated PMTU of the path is greater than an actual PMTU of the path, to cause multiple fragments of a reply message to be received from the destination device or multiple report messages to be received from an intermediate device on the path, and to include a flag that allows fragmentation of the request message into multiple fragments;
    sending, by the source device, the request message to the destination device via the intermediate device;
    receiving, by the source device, the multiple fragments of the reply message from the destination device, or the multiple report messages from the intermediate device responsive to the multiple fragments of the request message; and
    based on the multiple fragments of the reply message or the multiple report messages,
        determining, by the source device, that fragmentation of the request message has occurred because the estimated PMTU is greater than the actual PMTU; and
        updating, by the source device, the estimated PMTU based on a largest fragment among the multiple fragments of the reply message or among the multiple fragments of the request message.

2. The method of claim 1, wherein determining that fragmentation of the request message has occurred comprises:
    determining that the multiple report messages from the intermediate device each include a length of one of the multiple fragments of the request message.

3. The method of claim 2, wherein updating the estimated PMTU based on the at least one report message comprises:
    based on the length included in each of the multiple report messages, determining the largest fragment among the multiple fragments of the request message.

4. The method of claim 1, wherein configuring the request message further comprises:
    configuring the request message to have a time to live (TTL) parameter that expires at the intermediate device, wherein expiry of the TTL parameter causes the intermediate device to send the multiple report messages in the form of TTL expired messages.

5. The method of claim 4, further comprising:
    sending a further request message addressed to the destination device via the intermediate device and a further intermediate device on the path,
    wherein the further request message is configured to have a size of the updated estimated PMTU, to cause a further report message from the further intermediate device by updating the TTL parameter and to have a flag that allows fragmentation of the further request message;
    receiving the further report message from the further intermediate device responsive to the further request message; and
    in response to determining that fragmentation of the further request message has occurred, further updating the updated estimated PMTU based on the further report message.

6. The method of claim 5, further comprising repeatedly sending the further request message and updating the estimated PMTU until the reply message is received from the destination device.

7. The method of claim 1, wherein determining that fragmentation of the request message has occurred comprises:
    based on the multiple fragments of the reply message, determining that fragmentation of the reply message from the destination device has occurred, wherein the reply message sent by the destination device is substantially the same size as the request message sent by the source device.

8. The method of claim 1, wherein configuring the request message comprises: configuring the request message to have a TTL parameter that does not expire at the intermediate device, wherein the non-expiry of the TTL parameter allows the request message to reach the destination device to cause the destination device to send the reply message to the source device.

9. The method of claim 1, wherein updating the estimated PMTU based on the reply message comprises:
    determining the largest fragment among the multiple fragments of the reply message based on an initial fragment of the reply message.

10. The method of claim 1, wherein:
    the request message is an echo request message; and
    the reply message is an echo reply message that is configured to have the size of the estimated PMTU of the path and the flag that allows fragmentation of the echo reply message before reaching the source device.

11. The method of claim 1, wherein the request message is configured to cause the:
    the reply message from the destination device if routing between the source device and the destination device is symmetric; or
    the at least one report message from the intermediate device if routing between the source device and the destination device is asymmetric.

12. A non-transitory computer-readable storage medium that includes a set of instructions which, in response to execution by a processor, causes the processor to perform a method for a source device to perform discovery of a path maximum transmission unit (PMTU) of a path between the source device and a destination device in a communications network, the method comprising:

configuring, by the source device, a request message to have a size of an estimated PMTU of the path, wherein the estimated PMTU of the path is greater than an actual PMTU of the path, to cause multiple fragments of a reply message to be received from the destination device or multiple report messages to be received from an intermediate device on the path, and to include a flag that allows fragmentation of the request message into multiple fragments;

sending, by the source device, the request message to the destination device via the intermediate device;

receiving, by the source device, the multiple fragments of the reply message from the destination device, or the multiple report messages from the intermediate device responsive to the multiple fragments of the request message; and based on the multiple fragments of the reply message or the multiple report messages, determining, by the source device, that fragmentation of the request message has occurred because the estimated PMTU is greater than the actual PMTU; and updating, by the source device, the estimated PMTU based on a largest fragment among the multiple fragments of the reply message or among the multiple fragments of the request message.

13. The non-transitory computer-readable storage medium of claim 12, determining that fragmentation of the request message has occurred comprises:

determining that the multiple report messages from the intermediate device each include a length of one of the multiple fragments of the request message.

14. The non-transitory computer-readable storage medium of claim 13, wherein updating the estimated PMTU based on the at least one report message comprises:

based on the length included in each of the multiple report messages, determining the largest fragment among the multiple fragments of the request message.

15. The non-transitory computer-readable storage medium of claim 12, wherein configuring the request message comprises:

configuring the request message to have a time to live (TTL) parameter that expires at the intermediate device, wherein expiry of the TTL parameter causes the intermediate device to send the multiple report messages in the form of TTL expired messages.

16. The non-transitory computer-readable storage medium of claim 14, further comprising:

sending a further request message addressed to the destination device via the intermediate device and a further intermediate device on the path, wherein the further request message is configured to have a size of the updated estimated PMTU, to cause a further report message from the further intermediate device by updating the TTL parameter and to have a flag that allows fragmentation of the further request message;

receiving the further report message from the further intermediate device responsive to the further request message; and in response to determining that fragmentation of the further request message has occurred, further updating the updated estimated PMTU based on the further report message.

17. The non-transitory computer-readable storage medium of claim 16, further comprising repeatedly sending the further request message and updating the estimated PMTU until the reply message is received from the destination device.

18. The non-transitory computer-readable storage medium of claim 12, wherein determining that fragmentation of the request message has occurred comprises:

based on the multiple fragments of the reply message, determining that fragmentation of the reply message from the destination device has occurred, wherein the reply message sent by the destination device is substantially the same size as the request message sent by the source device.

19. The non-transitory computer-readable storage medium of claim 12, wherein configuring the request message comprises:

configuring the request message to have a TTL parameter that does not expire at the intermediate device, wherein non-expiry of the TTL parameter allows the request message to reach the destination device and to cause the destination device to send the reply message to the source device.

20. The non-transitory computer-readable storage medium of claim 12, wherein updating the estimated PMTU based on the reply message comprises:

determining the largest fragment among the multiple fragments of the reply message based on an initial fragment of the reply message.

21. The non-transitory computer-readable storage medium of claim 12, wherein:

the request message is an echo request message; and the reply message is an echo reply message that is configured to have the size of the estimated PMTU of the path and the flag that allows fragmentation of the echo reply message before reaching the source device.

22. The non-transitory computer-readable storage medium of claim 12, wherein the request message is configured to cause:

the reply message from the destination device if routing between the source device and the destination device is symmetric; or the at least one report message from the intermediate device if routing between the source device and the destination device is asymmetric.

* * * * *